United States Patent [19]

Koch et al.

[11] Patent Number: 4,778,609

[45] Date of Patent: Oct. 18, 1988

[54] HYDROGEN SULFIDE SUPPRESSION WITH AMINE DERIVATIVE

[75] Inventors: Frederick W. Koch, Willoughby Hills; Robert L. Floyd, Warrensville Heights, both of Ohio

[73] Assignee: The Lubrizol Corporation, Wickliffe, Ohio

[21] Appl. No.: 121,984

[22] Filed: Nov. 18, 1987

Related U.S. Application Data

[63] Continuation-in-part of Ser. No. 873,933, Jul. 21, 1986, which is a continuation of Ser. No. 727,453, Apr. 25, 1985, abandoned.

[51] Int. Cl.$^4$ ............................................. C10M 137/04
[52] U.S. Cl. .................................... 252/32.5; 252/47; 252/47.5; 252/50
[58] Field of Search .................. 252/32.7 E, 47.5, 50, 252/47, 32.5

[56] References Cited

U.S. PATENT DOCUMENTS

| | | | |
|---|---|---|---|
| 3,053,645 | 9/1962 | Cole et al. | 44/73 |
| 3,211,647 | 10/1965 | O'Halloran et al. | 252/50 |
| 3,211,653 | 10/1965 | O'Halloran | 252/50 |
| 3,634,248 | 1/1972 | Andress et al. | 252/51.5 |
| 3,909,428 | 9/1975 | De Vries et al. | 252/42.7 |
| 4,089,792 | 5/1978 | Lowe | 252/50 |
| 4,264,461 | 4/1981 | Chao et al. | 252/50 |
| 4,584,113 | 4/1986 | Walsh | 252/47 |
| 4,615,818 | 10/1986 | Di Biase et al. | 252/47.5 |

*Primary Examiner*—Jacqueline V. Howard
*Attorney, Agent, or Firm*—Karl Bozicevic; Denis A. Polyn; Robert A. Franks

[57] ABSTRACT

Functional fluids such as metal working fluids are disclosed which include an oil of lubricating viscosity, a sulfurized organic compound, and an amine derivative. The amine derivative is a hindered imine which is the reaction product obtained from reacting a primary amine connected to a tertiary alkyl group with an aldehyde or aldehyde reaction synthon. The inclusion of the hindered imine within the metal working fluid suppresses the generation of hydrogen sulfide gases during the use of the fluid thus improving the environmental and safety characteristics of the fluid.

17 Claims, No Drawings

HYDROGEN SULFIDE SUPPRESSION WITH AMINE DERIVATIVE

CROSS REFERENCES

The present application contains claims which relate in part to subject matter claimed within U.S. patent application Ser. No. 873,933 Filed July 21, 1986 pending which is a continuation of U.S. application Ser. No. 727,453 Filed Apr. 25, 1985, now abandoned on which applications we are the named coinventors and claim priority under 35 USC Section 120 and incorporate said applications herein by reference in their entirety.

FIELD OF THE INVENTION

The present invention relates generally to the field of functional fluids such as metal working fluids. More specifically, the invention relates to a metal working fluid containing a sulfurized organic compound and a hindered imine additive which suppresses the emission of hydrogen sulfide gases generated during the use of such metal working fluids.

BACKGROUND OF THE INVENTION

A variety of different types of fluids are utilized in connection with metal working and metal cutting operations. The use of such fluids greatly increases the efficiency of metal working operations and makes it possible to increase the useful life of cutting tools utilized in connection with metal working operations.

Sulfurized organic compounds are often used in connection with metal working fluids. The inclusion of sulfurized compounds is generally successful with respect to inhibiting oxidation. The higher the percentage of inactive sulfur present in the organic compound the greater the effect on inhibiting oxidation. However, due to the presence of the sulfur within the organic composition which is subjected to extreme temperatures and pressures, hydrogen sulfide gas is often generated and evolved from the working area. Hydrogen sulfide is of course extremely poisonous and therefore undesirable in a work environment. Accordingly, various means have been utilized in an attempt to suppress the generation of hydrogen sulfide emissions created during the use of metal working fluids.

Hydrogen sulfide stabilized oil-soluble sulfurized organic compositions are disclosed within U.S. Pat. No. 4,615,818 to Di Biase et al. The compositions disclosed therein are comprised of a sulfurized organic compound, a hindered organic amine and an additional organic compound such as a carboxylic acid. The combination of the hindered amine and the carboxylic acid suppresses hydrogen sulfide emissions when used in connection with certain sulfurized organic compounds. Accordingly, the concept of utilizing amine compounds in order to suppress the emission of hydrogen sulfide from a metal working fluid is generally known.

Various fuel compositions containing fatty diamine reaction products are disclosed within U.S. Pat. No. 3,053,645 to Cole et al. This patent discloses the use of a reaction product obtained by reacting a fatty diamine with an aldehyde as a means of stabilizing fuel oil against deterioration during storage. Accordingly, the general concept of modifying amine compounds by reacting such with an aldehyde in order to obtain an agent capable of providing for some degree of stabilization is also known.

Other aromatic amine derivatives obtained by reacting aromatic amines with an aldehyde or aldehyde reaction synthon are disclosed as useful stabilizers within U.S. Pat. No. 3,634,248 to Andress et al. The amine derivative compounds are indicated as being present in relatively small amounts within an organic composition such as a mineral lubricating oil or hydrocarbon fuel in order to provide for increased stabilization of the organic material during storage.

Aliphatic amines are disclosed as being included within lubricating oils within U.S. Pat. No. 4,264,461 to Chao et al. The patent contains a specific disclosure of aliphatic amines being useful in stabilizing hydrocracked lubricating oils against deterioration from light.

U.S. Pat. No. 3,909,428 to DeVries et al discloses the inclusion of nitrogen containing compounds into compositions in order to improve the oxidation stability of the composition.

Although a number of different types of fuel and lubricant stabilizers are known, the need to include high percent amounts of inactive sulfur in such fluids and the resulting hydrogen sulfide emissions remain as problems with respect to such fluids especially fluids containing certain types of sulfurized organic compounds. The present invention endeavors to solve these problems.

SUMMARY OF THE INVENTION

The present invention relates generally to functional fluids such as metal working fluids comprised of a major amount of oil of lubricating viscosity and minor amounts of a sulfurized component in combination with a hindered imine of the general structural formula (I):

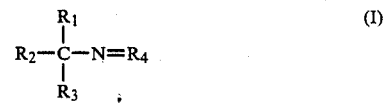

wherein $R_1$, $R_2$, $R_3$ and $R_4$ are each independently an alkyl moiety containing 1 to 14 carbon atoms. By including the specific hindered imine compound of general structural formula (I) within the working fluid it is possible to suppress the generation of hydrogen sulfide gases which are normally generated during the use of such a fluid. It has been found that specific hindered imine compounds successfully suppress hydrogen sulfide emissions when used in combination with certain sulfurized compounds but not necessarily in combination with other sulfurized compounds. The sulfurized compounds of the present invention contain relatively high percentage amounts of inactive sulfur. Sulfurized compounds of the invention can be obtained by the use of specific catalysts used in connection with the process disclosed herein.

The primary object of this invention is to provide a metal working fluid comprised of an oil of lubricating viscosity, a sulfurized component, and a hindered imine capable of suppressing the generation of hydrogen sulfide during the use of the metal working fluid.

A feature of this invention is that the specific group of hindered imine compounds have been found to be particularly useful with respect to suppressing the generation of hydrogen sulfide which might be created from the use of functional fluids containing a sulfurized fat containing inactive sulfur.

An advantage of the present invention is that the hindered imines of the invention successfully suppress the generation of hydrogen sulfide thus making the work environment in which the working fluid is used safer.

Another advantage of the present invention is that sulfurized organic compounds of the invention contain high percentage amounts of sulfur and exhibit oxidation inhibition can be used without the generation of hydrogen sulfide.

These and other objects, advantages and features of the present invention will become apparent to those persons skilled in the art upon reading the details of the formulation and components as more fully set forth below. Reference being made to the accompanying general structural formulae forming a part hereof wherein like symbols refer to like molecular moieties throughout.

DETAILED DESCRIPTION OF THE INVENTION

Before the present functional fluids containing a hydrogen sulfide emission suppression component and sulfurized organic compounds are specifically described, it is to be understood that this invention is not limited to the particular formulations, processes and components described as such may, of course, vary. It is also to be understood that the terminology used herein is for the purpose of describing particular embodiments only and is not intended to be limiting since the scope of the present invention will be limited only by the appended claims.

It must be noted that as used in this specification and the appended claims, the singular forms "a," "an" and "the" include plural referents unless the context clearly dictates otherwise. Thus for example, reference to "a sulfurized fat" includes mixtures of such fats, reference to "an imine" includes reference to mixtures of such imines, reference to "an oil of lubricating viscosity," includes mixtures of such oils and so forth.

The functional fluid of the invention is generally comprised of (A) a major amount of an oil of lubricating viscosity; (B) a sulfurized organic component; and (C) a hindered imine component having the general structural formula (I):

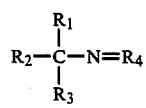

wherein $R_1$, $R_2$, $R_3$ and $R_4$ are each independently an alkyl moiety containing 1-14 carbon atoms. Preferably, the alkyl moieties $R_1$, $R_2$ and $R_3$ are each independently an alkyl moiety containing only 1-6 carbon atoms. Also it is preferably if the alkyl moiety for $R_4$ is $CH_2$.

The present invention is not directed specifically towards any of the individual components contained within the functional fluid of the invention but rather is directed to a formulation for a functional fluid which provides as essential components an oil of lubricating viscosity, a sulfurized organic component and a hindered imine. The formulation which includes these essential components preferably includes additional components known to those skilled in the art which are sufficient for making the functional fluid a metal working fluid. The fluid of the invention provides the sulfurized organic component which contains a relatively high percentage of inactive sulfur. This component allows for providing for oxidation inhibition when the fluid is used in connection with many applications such as when it is used as a metal working fluid. Metal working fluids are subjected to extreme temperatures and pressures at metal to metal cutting surfaces where it is essential to inhibit oxidation in order to prevent damage to the metals. The actual percentage of sulfur present within the sulfurized organic compound will vary depending upon the particular starting material which is sulfurized. However, by carrying out the sulfurization process disclosed herein it is possible to raise the percentage amount of inactive sulfur in the compound beyond levels obtained by known processes.

Although it is desirable to have a functional fluid such as a metal working fluid which contains a sulfurized organic compound containing a high amount of inactive sulfur, the presence of this sulfur causes a problem in the form of the generation of hydrogen sulfide when the functional fluid is utilized. In order to supress the generation of hydrogen sulfide when the fluid is being utilized the present inventors have included the hindered imine component (C). By utilizing the hindered imine component within the fluid formulation the generation of the extremely poisonous and hazardous hydrogen sulfide is supressed. This is extremely important in maintaining a safe working environment for workers utilizing functional fluids such as metal working fluids in that hydrogen sulfide gases can be deadly. The hindered imine component of the present invention provides for the supression of the hydrogen without substantially interfering with the oxidation inhibition characteristics of the sulfurized organic component.

THE HINDERED IMINE COMPONENT (C)

The functional fluid of the present invention preferably contains the hindered imine component (C) in an amount in the range of from about 0.01% to about 5% by weight based on the weight of the fluid as a whole. However, the amine component (C) is more preferably present in an amount of 0.25% to about 2% by weight based on the weight of the fluid as a whole.

Higher amounts of the imine component (C) are necessary depending upon the degree of hydrogen sulfide supression required. To a certain extent larger amounts of the imine component (C) are necessary when larger amounts of inactive sulfur are present within the fluid. However, the amount of the imine component (C) required also varies depending on the particular work environment and conditions such as the amount of pressure and temperature which the fluid is subjected to. As temperature increases the likelihood of generating hydrogen sulfide is increased thus requiring increased amounts of the amine component (C). Those of ordinary skill in the art can determine within the ranges indicated above the preferred amount of the imine component (C) to be used in connection with the fluid of the invention by varying the amount under different conditions.

The hindered imine component (C) is the component which is responsible for suppressing the generation of hydrogen sulfide during the use of the metal working fluid. This component is produced by reacting a primary amine connected to a tertiary alkyl group of general formula (II):

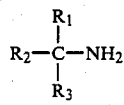

wherein $R_1$, $R_2$ and $R_3$ are each independently an alkyl moiety containing 1-14 carbon atoms, with an aldehyde or aldehyde reaction synthon. As indicated above, $R_1$, $R_2$ and $R_3$ are each preferably an alkyl moiety containing 1-9 carbon atoms.

The compounds of formula (I) are obtained by reacting a compound of formula (II) with an aldehyde or aldehyde reaction synthon, preferably an aldehyde reaction synthon. The reaction synthon is most preferably paraformaldehyde. When paraformaldehyde is reacted with the primary amine of general structural formula (II), the resulting imine component has the structure shown within general structural formula (I) wherein $R_4$ is $CH_2$.

The present inventors have found that the imine component (I) is particularly useful with respect to the suppression of hydrogen sulfide gases when the sulfurized component within the metal working fluid is a sulfurized organic compound containing only inactive sulfur. Such a sulfurized fat component is obtained by reacting elemental sulfur with a fat, alpha-olefin or triglyceride or mixture thereof in the presence of a catalyst. Preferably, the sulfurized organic compound is reacted with elemental sulfur in the presence of a phosphorus containing catalyst which is most preferably phosphoric acid or a salt thereof. By utilizing the catalyst in the form of phosphoric acid or a salt of a phosphoric acid, it is possible to obtain a sulfurized component which includes increased amounts of sulfur wherein the sulfur is inactive sulfur.

Some primary, hindered amines useful in connection with the present invention include octadecylamines, aniline, alkyl substituted anilenes such as 2,6-dimethylanidine and most preferably t-butylamine. Any hindered primary amine that could be used to form a stable imine of formula (I) could be used in connection with the present invention.

Although formaldehyde and paraformaldehyde are most preferably used in connection with the present invention, other aldehydes which might be used include acetaldehyde, benzaldehyde, salicylaldehyde, n-butylaldehyde, iso-butylaldehyde and acrolein.

The organic sulfurized compounds and hindered imines of the invention can be added directly to an oil of lubricating viscosity. Preferably, however, they are diluted with a substantially inert, normally liquid organic diluent such as mineral oil, naphtha, benzene, toluene or xylene, to form an additive concentrate. These concentrates usually contain form about 20% to about 90% by weight of a combination of the sulfurized organic compounds and hindered imine of this invention and may contain, in addition, one or more other additives known in the art and described below. The remainder of the concentrate is the substantially inert normally liquid diluent.

The hindered amine is present based on the amount of the sulfurized organic compound with consideration to other parameters indicated above. In general, the ratio of (sulfurized organic compound):(hindered imine) may be (200-20):(1-10) preferably (50-5):(1-5) more preferably about 20:1.

The invention also contemplates the use of other additives in the lubricant compositions of this invention. Such additives are those normally used in lubricating oils such as, for example, detergents, dispersants, oxidation-inhibiting agents, pour point depressing agents, extreme pressure agents, antiwear agents, color stabilizers and anti-foam agents.

The following examples are provided so as to provide those of ordinary skill in the art with a complete disclosure and description how to make the hindered imine compounds of the invention and are not intended to limit the scope of what the inventors regards as their invention. Efforts have been made to insure accuracy with respect to numbers used (e.g. amounts, temperature, etc.) but some experimental errors and deviation should be accounted for. Unless indicated otherwise, parts are parts by weight, temperature is in degrees C., pressure is at or near atmospheric.

EXAMPLE A

Charge a one liter, four necked flask equipped with a stirrer, thermowell, condenser and water separator with 100 parts toluene and 326 parts 2-methyl-6-tert-butylaniline. Heat the reaction mixture to 80° C. and add 66 parts paraformaldehyde (91%) in increments over a one hour period. Slowly increase the reaction temperature to 120° C. and slowly remove the water. Strip the solvent (toluene) from the reaction mixture and filter to give the desired imine product.

EXAMPLE B

Charge a one liter, four necked flask equipped with a stirrer, thermowell, condenser and water separator with 100 parts toluene and 300 parts 2-ethyl-6-tert-butylaniline. Slowly heat the reaction mixture to about 75°-80° C. while gradually adding 70 parts of paraformaldehyde over a one hour period. Slowly increase the reaction temperature to 120° C. and slowly remove the water. Strip the solvent (toluene) from the reaction mixture and filter to give the desired imine product which can be used as component (C) in a formulation of the invention.

EXAMPLE C

Charge a one liter, four necked flask equipped with a stirrer, thermowell, condenser and water separator with 100 parts toluene and 300 parts t-butylaniline. Heat the reaction mixture to 80° C. and add 100 parts of formaldehyde in increments over a one hour period. Slowly increase the reaction temperature to 120° C. and slowly remove the water. Strip the solvent (toluene) from the reaction mixture and filter to give the desired imine product which can be added to a metal working fluid in an amount of about 0.1% to about 5% by weight based on the total weight of the fluid.

EXAMPLE D

Charge a one liter, four necked flask equipped with a stirrer, thermowell, condenser and water separator with 50 parts toluene and 200 parts aniline. Heat the reaction mixture to 80° C. and add 50 parts of paraformaldehyde in increments over a one hour period. Slowly increase the reaction temperature to 120° C. and slowly remove the water. Strip the solvent (toluene) from the reaction mixture and filter to give the desired imine product useful as component (C) in formulations of the invention to inhibit hydrogen sulfide generation.

EXAMPLE E

Charge a one liter, four necked flask equipped with a stirrer, thermowell, condenser and water separator with 200 parts toluene and 200 parts t-butylaniline. Heat the reaction mixture to 80° C. and add 100 parts n-butylaldehyde in increments over a one hour period. Slowly increase the reaction temperature to 120° C. and slowly remove the water. Strip the solvent (toluene) from the reaction mixture and filter to give the desired imine product which suppresses H2S gases when used in connection with sulfurized organic compounds.

THE SULFURIZED ORGANIC COMPONENT (B)

Sulfurized organic compounds require the hindered imine compounds of the invention in that such compounds generate hydrogen sulfide. The sulfurized compounds which benefit most from the hindered imines of the invention will now be described in detail.

The term "fatty acid" refers to acids which may be obtained by the hydrolysis of a naturally occurring vegetable or animal fat or oil. These are usually in $C_{16-20}$ range and include palmitic acid, stearic acid, oleic acid, linoleic acid, etc.

The term "fatty acid esters" are fatty acid esters of polyhydric alcohols. Examples of suitable polyhydric alcohols include ethylene glycol, propylene glycol, trimethylene glycol, neopentyl glycol, glycerol, etc. Fatty oils which are naturally occurring esters of glycerol with long chain carboxylic acids, and synthetic esters of similar structure are useful. Preferred fatty acid esters of the present invention are fatty oils derived from unsaturated acids, especially oleic and linoleic acids, including such naturally occurring animal fats and vegetable oils as tall oil, lard oil, peanut oil, cottonseed oil, soybean oil, sunflower oil, corn oil, etc. Specially grown sunflower oils containing high amounts of oleic acid (e.g., 80% by weight or more of oleic acid) can be sulfurized. Such sunflower oils are available commercially under the general trade designation of TRISUN from SVO Enterprises Corporation, Wickliffe, Ohio.

Although various compositions utilizing only one type of fatty acid ester of polyhydric alcohol are soluble and useful as oil additives, the use of mixtures of fatty acid esters of polyhydric alcohols is preferred. In particular, mixtures of fatty acid esters of polyhydric alcohols containing at least about 50% by weight of lard oil, generally from about 50% to about 80% by weight of lard oil can be used in the formation of sulfurized compositions containing the desirably high amounts of sulfur and are relatively inexpensive. Moreover, such sulfurized materials prepared as indicated below are characterized by a reduction in undesirable color. The examples of mixtures based on lard oil include, for example, a mixture of 50 parts by weight of lard oil and 50 parts by weight of soybean oil, a mixture containing 75 parts of lard oil and 25 parts of soybean oil, and a mixture comprising 60 parts of lard oil and 40 parts of peanut oil.

Compositions which can be sulfurized include a fatty acid or fatty acid ester of a monohydric alcohol, or mixtures thereof. Fatty acids of the types described above which can be utilized include unsaturated fatty acids such as oleic acid, or linoleic acid. Mixtures of fatty acids such as obtained from tall oil or by the hydrolysis of peanut oil, soybean oil, sunflower oil, etc., also are useful. Esters of fatty acids obtained from monohydric alcohols containing up to about 20 carbon atoms can be utilized either alone or in combination with fatty acids. Examples of monohydric alcohols useful in preparing the fatty acid esters include methanol, ethanol, n-propanol, isopropanol, the butanols, etc. Specific examples of fatty acid esters of monohydric alcohols useful include methyl oleate, ethyl oleate, lauryl oleate, methyl linoleate, oleyl oleate, oleyl stearate, cetyl linoleate, etc.

The sulfurized organic compounds may be derived from at least one aliphatic olefin containing from about 8 to about 36 carbon atoms. Preferably, the olefins will contain about 12 to about 24 carbon atoms. The olefins are preferably terminal olefins (i.e., alpha-olefins), and may include internal olefins or mixtures thereof. The alpha olefins useful in this invention are illustrated by 1-octene, 1-decene, 1-dodecene, 1-tetradecene, 1-hexadecene, 1-octadecene, 1-eicosene. The internal olefins may be represented by the following general formula

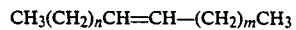

$$CH_3(CH_2)_nCH=CH-(CH_2)_mCH_3$$

wherein n and m are independently integers from 0 to about 15 and the total number of carbon atoms is at least 8. Examples of internal olefins useful in this invention include 2-octene, 2-dodecene, 4-dodecene, 9-octadecene, 7-tetradecene, 7-hexadecene and 11-eicodecene. Mixtures of two or more olefins are useful. One method for preparing such mixtures of olefins is by the isomerization of commercially available alpha-olefins, and the product of the isomerization reaction is a mixture of olefins wherein the double bond is in the 1, 2, 3, 4, etc. position. Alternatively, the mixture of olefins may be obtained by fractionation or by blending of olefins of various types and molecular weights. The isomerization of terminal olefins is effected by heating the olefin with one or more mildly acidic catalysts. Alpha-olefins, and particularly those containing about 12 to about 24 carbon atoms are preferred. Mixtures of such olefins are commercially available and are particularly desirable for use in the present invention. For example, a commercially available mixture of olefins containing 18-24 carbons is available from Ethyl Corporation.

The olefins may be branched aliphatic olefins. Examples of branched olefins include oligomers of propylene and isobutylene such as propylene tetramer and triisobutylene.

Preferred sulfurized compositions of the invention are prepared by reacting at an elevated temperature sulfur with a mixture comprising (A) about 100 parts by weight of at least one fatty acid ester of a polyhydric alcohol, (B) from about 0 to about 200 parts by weight of at least one fatty acid ester of a monohydric alcohol, or a mixture thereof, (C) from about 0 to about 400 parts by weight of at least one aliphatic olefin containing from about 8 to about 36 carbon atoms, and (E) a catalytic amount of phosphoric acid, a phosphoric acid salt, phosphoric acid ester, or a mixture thereof. Preferably these mixtures will contain at least about two parts of the fatty acid or fatty acid ester (B). The catalyst or sulfurization promoter is preferably phosphoric acid or a salt thereof. A preferred range is from about 2 to about 100 parts of (B) per 100 parts of (A). Other preferred mixtures contain at least about 25 parts of the aliphatic olefin (C). A particularly useful range of (C) is from about 25 to about 100 parts of (C) per 100 parts of (A). In another preferred embodiment the mixture which is sulfurized will contain all three components (A), (B) and (C).

The sulfurization reactions of the present invention are carried out in the presence of (E) a catalytic amount of phosphoric acid, a phosphoric acid salt, a phosphoric acid ester or a mixture thereof. The phosphorus acid salts preferably are alkali metal phosphates monoacid orthophosphate, and sodium diacid orthophosphate. The alkali metal phosphates can be formed in situ by merely adding an alkali metal hydroxide such as sodium hydroxide and phosphoric acid to the mixture which is to be sulfurized. The phosphoric acid esters useful as catalyst may be mono or di-alkyl esters containing up to about 20 carbon atoms in each alkyl group. Examples of alkyl groups include methyl, ethyl, propyl, pentyl, decyl, and hexadecyl, etc.

The amount of phosphoric acid, phosphoric acid salt, phosphoric acid ester, or mixtures thereof which is included in the reaction in accordance with the present invention will range from about 0.0001 to about 5 parts by weight of the catalyst per 100 parts of the combined weight of components (A), (B) and (C). Larger amounts of the catalyst may be used but are not necessary. Although phosphoric acid salts and esters can be utilized, the sulfurization reaction is catalyzed by phosphoric acid alone, and this catalyst is preferred. Generally, the phosphoric acid will be introduced into the reaction mixture as 85% phosphoric acid. The order of mixing the various components is not critical although when an alkali metal phosphate is to be utilized as a catalyst, the alkali metal hydroxide initially is added to the reaction mixture which is heated, and thereafter, the phosphoric acid is added prior to the introduction of the sulfurizing agent.

The sulfurization reaction generally is effected at an elevated temperature of from about 50° to about 350° C., more preferably, at a temperature of from about 100° to about 250°. The reaction is effected with efficient agitation and usually in an inert atmosphere such as nitrogen. If any of the reagents are appreciably volatile at the reaction temperature, the reaction vessel may be sealed and maintained under pressure. Although generally not necessary, the reaction may be effected in the presence of an inert solvent such as an alcohol, ether, ester, aliphatic hydrocarbon, halogenated aromatic hydrocarbon, etc., which is a liquid within the temperature range employed for the reaction.

The sulfurizing agents useful in the process of the present invention include, sulfur, sulfur monochloride and/or sulfur dichloride a mixture of hydrogen sulfide and sulfur or sulfur dioxide, etc. Preferably, the sulfurizing agent is elemental sulfur. It is frequently advantageous to add the sulfurizing agent portionwise to the mixture of the other reagents. When elemental sulfur is utilized as a sulfurizing agent, the reaction is exothermic which can be utilized as a cost-cutting benefit. The amount of sulfur or sulfurizing agent added to the reaction mixture can be varied over a wide range although the amount included in the reaction mixture should be an amount sufficient to provide a sulfurized product containing the desired amount of sulfur which generally is at least about 10% by weight.

Following the sulfurization reaction, it is preferred to remove substantially all low boiling materials, typically by venting the reaction vessel, by sparging with an inert gas such as nitrogen, by vacuum distillation or stripping, etc. Insoluble by-products may be removed by filtration if necessary, usually at an elevated temperature (about 80°–120° C.).

A further optional step in the preparation of the sulfurized compositions is the treatment of the sulfurized product obtained as described above to reduce any active sulfur which may be present. An illustrative method is the treatment with an alkali metal sulfide. Other optional treatments may be employed to improve product quality such as odor, color, and staining characteristics of the sulfurized compositions.

The sulfurized compositions of the present invention will normally be employed in the lubricating composition of the invention in an amount of from about 0.1% to about 20% by weight of the particular oil in which they are utilized. The optimum amount of both components to be used in a given lubricant obviously would depend on the other contents of the particular lubricating composition, the operating conditions to which it is to be subjected, and the particular additives employed in different lubricating compositions operated under extremely adverse conditions.

The following examples illustrate the preparation of the sulfurized organic compound of the present invention. Unless otherwise indicated in the examples and elsewhere in the specification and claims, all parts and percentages are by weight, and temperatures are in degrees centigrade.

EXAMPLE 1

Prepare a mixture of 1500 parts of peanut oil, 681 parts of methyl oleate and 9 parts of a 50% aqueous solution of sodium hydroxide in a reaction vessel and heat for about 3 hours at about 98° C. Add phosphoric acid (85%, 16.5 parts) and stir the mixture for about 15 minutes, and add 81 parts of oleic acid. Sparge the mixture with nitrogen to about 148° C. and add 266 parts of sulfur in three increments. Raise the temperature of the reaction mixture to about 200° C. and maintain at this temperature for a total of about 7 hours and filter while hot through a filter aid. The filtrate is the desired product.

EXAMPLE 2

Prepare a mixture of 300 parts of soybean oil, 300 parts of winter-strained lard oil, and 5 parts of a 50% aqueous sodium hydroxide solution and heat to a temperature of 100° C. and maintain at this temperature for about 2.5 hours. Add phosphoric acid (85%, 2 parts) and 100 parts of methyl oleate and heat the mixture to a temperature of about 150° C. in a nitrogen atmosphere. Add to this mixture 164.2 parts of sulfur in three increments, and after addition of the sulfur is completed, raise the temperature of the mixture to about 200° C. and maintain at this temperature for about 0.5 hour. Remove the source of nitrogen and maintain at 200° C. for 2.5 hours, and, thereafter, for an additional 3 hours while sparging with nitrogen. Cool the mixture to about 50° C. and filter through a filter aid. The filtrate is the desired product.

EXAMPLE 3

Prepare a mixture of 500 parts of peanut oil, 227 parts of soybean oil and 3 parts of a 50% aqueous solution of sodium hydroxide and heat to a temperature of 100° C. for about 3 hours. Add phosphoric acid (85%, 5.6 parts) and 27 parts of oleic acid to the mixture and heat to a temperature of 142° C. in a nitrogen atmosphere. Add sulfur (88.5 parts) in three increments and maintain the reaction temperature at about 142°–145° C. Continue heating to raise the temperature to 200° C. and maintained at this temperature for about 5 hours while sparging with nitrogen. Filter the reaction mixture through a filter aid at a temperature of about 70° C. The filtrate is the desired product.

EXAMPLE 4

Prepare a mixture of 750 parts of lard oil, 250 parts of soyben oil, 454 parts of commercial $C_{16-18}$ alpha-olefins and 3 parts of a 50% aqueous sodium hydroxide solution and heat to a temperature of about 100° C. over a period of 3 hours. Add phosphoric acid (85%, 2.5 parts) to the mixture with stirring over a period of 15 minutes, and heat the mixture to 145° C. Add sulfur (186 parts) in three increments at this temperature. Heat the mixture to about 190° C. and maintain at a temperature of about 190°–200° C. for a total of about 11 hours in a nitrogen atmosphere. Cool to about 100° C., and filter through a filter aid. The filtrate is the desired product.

EXAMPLE 5

Prepare a mixture of 750 parts of lard oil, 250 parts of soybean oil, 454 parts of a commercial $C_{16-18}$ alpha-olefins and 2 parts of a 50% aqueous sodium hydroxide solution and heat from room temperature to 100° C. in about 3 hours. Add phosphoric acid (85%, 2.5 parts) and 30 parts of oleic acid and heat to 150° C. Add 184 parts of sulfur in three increments over a 15 minute period. Raise the temperature of the reaction mixture to about 200° C. and maintain at about 200° C. Filter through a filter aid. The filtrate is the desired product.

EXAMPLE 6

Repeat the general procedure of Example 5 except add 4 parts of a 50% sodium hydroxide solution.

EXAMPLE 7

Prepare a mixture of 750 parts of lard oil, 250 parts of soybean oil, 30 parts of oleic acid and 454 parts of a commercial $C_{16-18}$ alpha-olefin and heat to a temperature of 100° C. over a period of 3 hours. Add phosphoric acid (85%, 2.5 parts) to the mixture and heat to 145° C. add 184 parts of sulfur in three increments over a 15 minute period. Maintain at 200° C. for 2 hours and continue heating at this temperature while sparging with nitrogen for about 6 hours. Cool the mixture to 100° C. and filter. The filtrate is the desired product.

EXAMPLE 8

Prepare a mixture of 667 parts of lard oil, 333 parts of soybean oil, 454 parts of a commercial $C_{16-18}$ alpha-olefins and 2 parts of a 50% aqueous solution of sodium hydroxide. Sparge with nitrogen while heating the mixture. Cool to room temperature and add 3 parts of 85% phosphoric acid with stirring followed by the addition of 53 parts of oleic acid. Add 184 of sulfur in two increments. Heat to 145° C. whereupon an exothermic reaction will occur raising the temperature of the reaction mixture to about 208° C. Heat the mixture while sparging. Maintain the reaction mixture at about 200° C. for 0.25 hour at 35 mm. of mercury. Cool the mixture and filter through a filter aid. The filtrate is the desired product.

EXAMPLE 9

Prepare a mixture of 333 parts of lard oil, 167 parts of a sunflower oil containing about 83% of oleic acid, 27 parts of oleic acid, 227 parts of a commercial C16-18 alpha-olefin mixture and 1.1 parts of 85% phosphoric acid and heat to 150° C. Add sulfur (93 parts) in two increments. Heat the mixture to 200° C. (exothermic to 205° C.). Cool the mixture to about 200° C. and maintained at this temperature for one hour and thereafter for 2.5 hours while sparging with nitrogen to remove volatiles. Filter through a filter aid. The filtrate is the desired product.

BASE OILS AND BLENDS-COMPONENT(A)

The functional fluids, such as the metal working fluids, of the present invention comprise a major amount of oil of lubricating viscosity, including natural and synthetic lubricating oils and mixtures thereof.

Natural oils include animal oils and vegetable oils (e.g., castor oil, lard oil) as well as mineral lubricating oils such as liquid petroleum oils and solvent-treated or acid treated mineral lubricating oils of the paraffinic, naphthenic or mixed paraffinic-naphthenic types. Oils of lubricating viscosity derived from coal or shale are also useful. Synthetic lubricating oils include hydrocarbon oils such as polymerized and interpolymerized olefins (e.g., polybutylenes, polypropylenes, propylene-isobutylene copolymers, chorinated polybutylenes, etc.); poly (1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)benzenes, etc.); alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono-acetic acid esters, mixed $C_3$–$C_8$ fatty acid esters or the $C_{13}$Oxo acid diester of tetraethylene glycol.

Another suitable class of synthetic lubricating oils that can be used comprises the esters of dicarboxylic acids (e.g., phthalic acid, succinic acids, alkenyl succinic acids, maleic acid, azelic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl) silicate, tetra-(p-tert-butyl-phenyl)silicate, hexyl(4-methyl-2-pentoxy)disiloxane, poly(methyl)siloxanes, poly(methylphenyl)siloxanes, etc. Other synthetic lubricating oils include liquid esters of phosphorus containing acids (e.g., tricresyl phosphate, trioctyl phosphate, diethyl ester or decane phosphonic acid, etc.), polymeric tetrahydrofurans and the like.

Unrefined, refined and rerefined oils, either natural or synthetic (as well as mixtures of two or more of any of these) of the type disclosed herein above can be used in the compositions of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

FORMULATION EXAMPLE 1

Prepare a blend using a 100N base oil and adding to it 5% by weight of a sulfurized fat of Example 2 and 0.25% by weight of an imine Example A.

FORMULATION EXAMPLE 2

Same as above but use Example 1 for sulfurized fat and include 2.5% of a chlorinated wax (40% Cl).

FORMULATION EXAMPLE 3

Same as Example 1 but use Example 4 for the sulfurized fat and include 5% of a tetrasulfide prepared by reacting octyl mercaptan with sulfur chloride.

FORMULATION EXAMPLE 4

Add a base oil to a suitable blending container and add to the oil, with mixing, about 0.1 to 20% of the sulfurized organic compound of any of examples 1–9 and blend in 0.01 to 5% by weight of the imine of any of examples A–E.

The instant invention is described and disclosed herein in what is considered to be the most practical, and preferred embodiments. It is recognized, however, that departures may be made therefrom which are within the scope of the invention, and that obvious modifications will occur to one skilled in the art upon reading this disclosure.

What is claimed is:

1. A functional fluid, comprising:
   (A) an oil of lubricating viscosity;
   (B) a sulfurized organic compound selected from the group consisting of fats, alpha-olefins, fatty acid esters and triglycerides; and
   (C) a hindered imine of general structural formula (I):

wherein $R_1$, $R_2$, $R_3$ and $R_4$ are each independently an alkyl moiety containing 1 to 14 carbon atoms.

2. The fluid as claimed in claim 1, wherein $R_4$ is $CH_2$.

3. The fluid as claimed in claim 2, wherein $R_1$, $R_2$ and $R_3$ each independently an alkyl moiety containing 1 to 9 carbon atoms.

4. The fluid as claimed in claim 3, wherein the hindered imine (C) is present in the fluid in an amount in the range of from about 0.01% to about 5% by weight based on the weight of the fluid as a whole.

5. The fluid as claimed in claim 4, wherein the hindered imine (C) is present in an amount in the range of from about 0.10% to about 2.0% by weight based on the weight of the fluid as a whole and the functional fluid is a metal working fluid.

6. A metal working fluid, comprising:
   (A) an oil of lubricating viscosity;
   (B) a sulfurized organic compound selected from the group consisting of fats, fatty acid esters, alpha-olefins and triglycerides; and
   (C) a hindered imine produced by reacting a primary amine connected to a tertiary alkyl group of general formula (II):

wherein $R_1$, $R_2$ and $R_3$ are each independently an alkyl moiety containing 1 to about 14 carbon atoms, with an aldehyde or aldehyde reaction synthon.

7. The metal working fluid as claimed in claim 6, wherein the sulfurized organic compound (B) is obtained by reacting elemental sulfur with the organic compound in the presence of a catalyst.

8. The metal working fluid as claimed in claim 7, wherein the catalyst is selected from the group consisting of phosphoric acid and salts thereof effective in catalyzing the sulfurization of the organic compound and the reacting is carried out at a temperature in the range of about 100° C. to about 250° C.

9. The metal working fluid as claimed in claim 8, wherein the sulfurized organic compound of (B) is present in an amount of 0.1% to 20% by weight and the hindered imine (C) is present in an amount of about 0.1% to about 5% by weight based on the weight of the fluid.

10. The metal working fluid of claim 6, wherein the amine of formula (II) is t-butylamine.

11. The metal working fluid of claim 6, wherein the amine of formula (II) is reacted with paraformaldehyde.

12. The metal working fluid of claim 9, wherein the amine of formula (II) is t-butylamine which is reacted with paraformaldehyde.

13. A metal working fluid, comprising:
(A) an oil of lubricating viscosity;
(B) a sulfurized organic compound obtained by reacting an unsaturated aliphatic compound containing 12 to 28 carbon atoms with elemental sulfur in the presence of a catalyst selected from the group consisting of phosphoric acid and salts thereof; and
(C) a hindered imine of the following general structural formula:

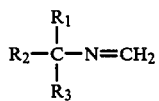

wherein $R_1$, $R_2$, and $R_3$ are each independently an alkyl moiety containing 1 to 9 carbon atoms.

14. The fluid as claimed in claim 13, wherein the sulfurized organic compound (B) is present in an amount of 0.1% to 20% by weight and the hindered imine (C) is present in an amount of about 0.1% to about 5% by weight based on the weight of the fluid.

15. The fluid as claimed in claim 14, wherein the aliphatic compound is selected from the group consisting of a fatty acid and a fatty acid ester of a monohydric alcohol.

16. The fluid as claimed in claim 15, wherein the aliphatic compound is a fatty acid containing 14 to 22 carbons.

17. The fluid as claimed in claim 13, wherein the catalyst is phosphoric acid.

* * * * *